(12) United States Patent
Chen

(10) Patent No.: US 8,244,072 B2
(45) Date of Patent: Aug. 14, 2012

(54) SYSTEM AND METHOD FOR DETERMINING COLOR VALUE OF PIXEL

(76) Inventor: Yi-Peng Chen, Taipei (TW)

(*) Notice: Subject to any disclaimer, the term of this patent is extended or adjusted under 35 U.S.C. 154(b) by 1139 days.

(21) Appl. No.: 12/114,101

(22) Filed: May 2, 2008

(65) Prior Publication Data

US 2009/0041342 A1 Feb. 12, 2009

(30) Foreign Application Priority Data

Aug. 8, 2007 (TW) ................................ 96129269 A

(51) Int. Cl.
*G06K 9/32* (2006.01)

(52) U.S. Cl. ........................................ 382/299; 348/252

(58) Field of Classification Search .......... 348/448–453; 382/298–300
See application file for complete search history.

(56) References Cited

U.S. PATENT DOCUMENTS

| | | | | |
|---|---|---|---|---|
| 5,027,201 A * | 6/1991 | Bernard | ........................ | 348/702 |
| 6,157,415 A * | 12/2000 | Glen | ............................ | 348/599 |
| 6,414,719 B1 | 7/2002 | Parikh | | |
| 6,757,022 B2 * | 6/2004 | Wredenhagen et al. | ...... | 348/452 |
| 6,788,312 B1 * | 9/2004 | Azar et al. | .................... | 345/694 |
| 6,909,752 B2 * | 6/2005 | Zhou | ........................ | 375/240.21 |
| 7,098,958 B2 * | 8/2006 | Wredenhagen et al. | ...... | 348/452 |
| 7,142,247 B2 | 11/2006 | Jung | | |
| 7,230,633 B2 * | 6/2007 | Weybrew et al. | ............. | 345/629 |
| 7,349,026 B2 * | 3/2008 | Wyman et al. | ................ | 348/441 |
| 7,349,029 B1 * | 3/2008 | Chou | ............................ | 348/448 |
| 7,405,766 B1 * | 7/2008 | Chou et al. | .................... | 348/448 |
| 7,467,287 B1 * | 12/2008 | Bratt et al. | ........................ | 712/4 |
| 7,596,280 B2 * | 9/2009 | Bilbrey et al. | ................ | 382/274 |
| 2002/0047930 A1 * | 4/2002 | Zhou | ............................ | 348/578 |
| 2004/0207753 A1 | 10/2004 | Jung | | |
| 2006/0114264 A1 * | 6/2006 | Weybrew et al. | ............. | 345/592 |

FOREIGN PATENT DOCUMENTS

| | | |
|---|---|---|
| EP | 1223748 A2 | 7/2002 |
| EP | 1223748 A2 | 7/2002 |
| WO | 2005/071957 A1 | 8/2005 |

* cited by examiner

*Primary Examiner* — Chan S Park
*Assistant Examiner* — Sean Motsinger
(74) *Attorney, Agent, or Firm* — Kirton McConkie; Evan R. Witt

(57) ABSTRACT

A method and a system are used for determining color value of a pixel for an image processing operation, including steps of: providing a reference depth value representing a level of motion of the pixel; providing a plurality of color values and corresponding depth values of the pixel at a plurality of levels of motion; and selecting a target color value of the pixel among the plurality of color values according to the reference depth value and the plurality of depth values.

12 Claims, 10 Drawing Sheets

SYSTEM AND METHOD FOR DETERMINING COLOR VALUE OF PIXEL

FIELD OF THE INVENTION

The present invention relates to a system and a method for determining color value of pixels, and more particularly to a system and a method for determining color value of pixels for image processing.

BACKGROUND OF THE INVENTION

Interlacing and non-interlacing (or progressive) image scanning and displaying techniques are widely applied to a variety of systems. Thus, when an image is transmitted between systems or for display, conversion between interlacing and non-interlacing formats is often required.

Please refer to FIG. 1 which schematically illustrates a de-interlacing processing. An odd field 11 and an even field 12 to be de-interlaced are shown, each including a half of scan lines of a scanned image. After a de-interlacing operation 13, a non-interlaced frame 14 is obtained, which includes all scan lines, as shown in FIG. 1. The odd field 11 comprises first scan line 111, third scan line 113, fifth scan line 115, and so on. The even field 12 comprises second scan line 122, fourth scan line 124, sixth scan line 126, and so on. After the de-interlacing operation 13, a non-interlacing frame 14 is obtained, including all scan lines 141, 142, 143, 144, 145, 146, . . . of the scanned image corresponding to the interlaced lines 111, 122, 113, 124, 115, 126, . . . respectively.

The de-interlacing operation 13 is implemented with interpolation. That is, data of the missing lines in the odd field 11 or even field 12 are estimated by way of interpolation. Two kinds of interpolating algorithms may be applied to the de-interlacing operation. One is spatial interpolation, and the other is temporal interpolation. The spatial interpolation calculates the missing even lines or odd lines by interpolating corresponding adjacent lines in the odd field 11 or the even field 12 respectively. For example, the even scan line 144 of the non-interlacing frame 14 can be obtained by interpolating the scan lines 113 and 115 in the odd field 11. Similarly, the entire non-interlacing frame 14 can be obtained by interpolating every pair of adjacent lines in the odd field 11. On the other hand, the temporal interpolation method fills the missing lines with corresponding lines in the preceding field. For example, the odd scan line 113 in the odd field 11 can be used to fill the missing odd scan line between the even scan lines 122 and 124 of the even field 12. Accordingly, the entire non-interlacing frame 14 is obtained with the even scan lines 122, 124, 126, . . . in the even field 12 serving as the even scan lines 142, 144, 146, . . . and the odd scan lines 111, 113, 115, . . . obtained at the preceding time point serving as the odd scan lines 141, 143 and 145, . . . .

By taking advantage of both the interpolation methods, a motion adaptive de-interlacing algorithm is developed. A level of motion is determined by performing motion-detection in each field. Then a proper de-interlacing algorithm and its corresponding ratio are chosen according to the obtained levels of motion. An exemplary motion adaptive de-interlacing system used in a computer system is shown in FIG. 2. The motion adaptive de-interlacing system comprises a motion-detection module 21 for performing two-level motion-detection according to a current field F(n), preceding field F(n−1) and next field F(n+1). The motion-detection module 21 also generates a control signal to control a multiplexer 22 to select one of the outputs from a spatial interpolation module 23 and a temporal interpolation module 24, then the selected output is integrated with the current field F(n) as a non-interlacing frame 25.

Generally speaking, for motion images, spatial interpolation will produce better quality than temporal interpolation. This is because the spatial interpolation module 23 does not consider the preceding field F(n−1). On the contrary, temporal interpolation will have better performance than spatial interpolation for still images. Consequently, the spatial interpolation module 23 and the temporal interpolation module 24 selectively function depending on the practical use.

To perform the motion-detection, a conventional computer system requires additional motion-detection module 21 in order to detect the level of motion of the current field F(n). Complexity of the motion-detection-module 21 may grow large as the levels of motion to be detected increases. It is apparently disadvantageous in hardware cost of the computer system.

SUMMARY OF THE INVENTION

Therefore, the present invention provides a device and a method for determining color data of pixels, thereby performing de-interlacing without additional hardware.

The present invention provides a method for determining color value of a pixel for an image processing operation, comprising steps of: providing a reference depth value representing a level of motion of the pixel; providing a plurality of color values and corresponding depth values of the pixel at a plurality of levels of motion; and selecting a target color value of the pixel among the plurality of color values according to the reference depth value and the plurality of depth values.

The present invention also relates to a system for determining color value of a pixel for an image processing operation, comprising: a depth-value buffer for storing a reference depth value representing a level of motion of the pixel; and a rendering engine coupled to the depth-value buffer for receiving a plurality of color values and corresponding depth values of the pixel at a plurality of levels of motion respectively, and selecting of one of the plurality of color values as a target color value of the pixel according to the reference depth value and the plurality of depth values.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

For performing de-interlacing without additional motion-detection module while still taking advantage of both spatial and temporal interpolations, the present invention utilizes hardware and/or software already existing in the computer system to achieve the objects.

Figure 4:
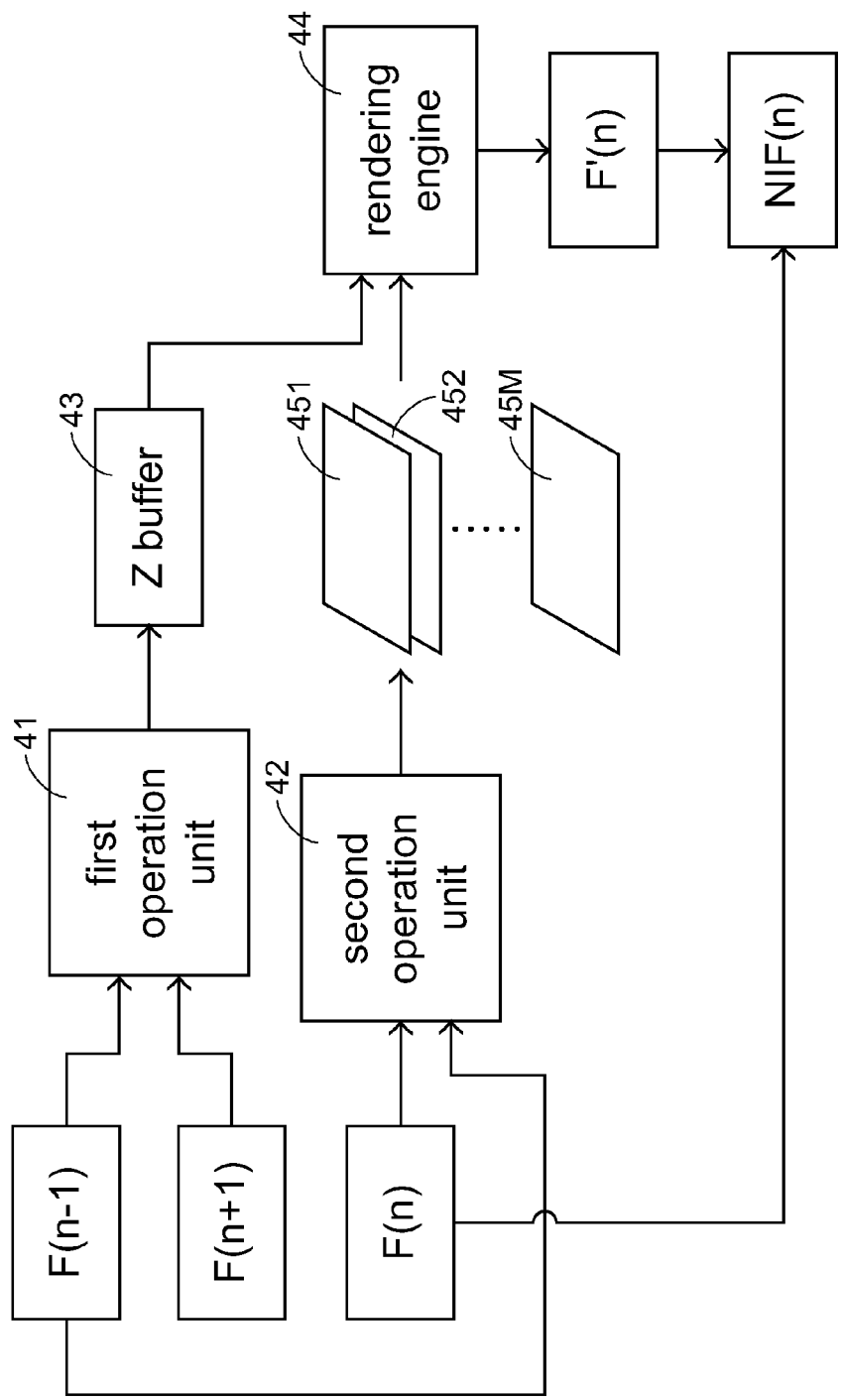
FIG. 4 is a schematic functional block diagram illustrating a system for determining color value of pixels, which is capable of performing a de-interlacing operation, according to an embodiment of the present invention.

FIG. 4 illustrates a block diagram of a de-interlacing operation in a computer system according to an embodiment of the present invention. The computer system sequentially receives a plurality of interlacing field data from, for example, a TV signal source, a hard disk drive or a DVD. The fields received may comprises a current field F(n), a preceding field F(n−1) and a next field F(n+1). The purpose of the de-interlacing operation is to calculate the missing field F'(n) corresponding to the current field F(n) for a non-interlaced frame NIF(n).

The de-interlacing operation utilizes a first operation unit 41, a second operation unit 42, a depth-value Z buffer 43 and a rendering engine 44. Pixels f(n−1) in preceding field F(n−1) and pixels f(n+1) in next field F(n+1) are inputted to the first operation unit 41 to determine the corresponding levels of motion for each pixel in the missing field F'(n). Various algorithms have been developed for determining levels of motion, and thus are not redundantly described herein. These algorithms or any other proper algorithm can be used in the first operation unit 41.

Figure 5A:
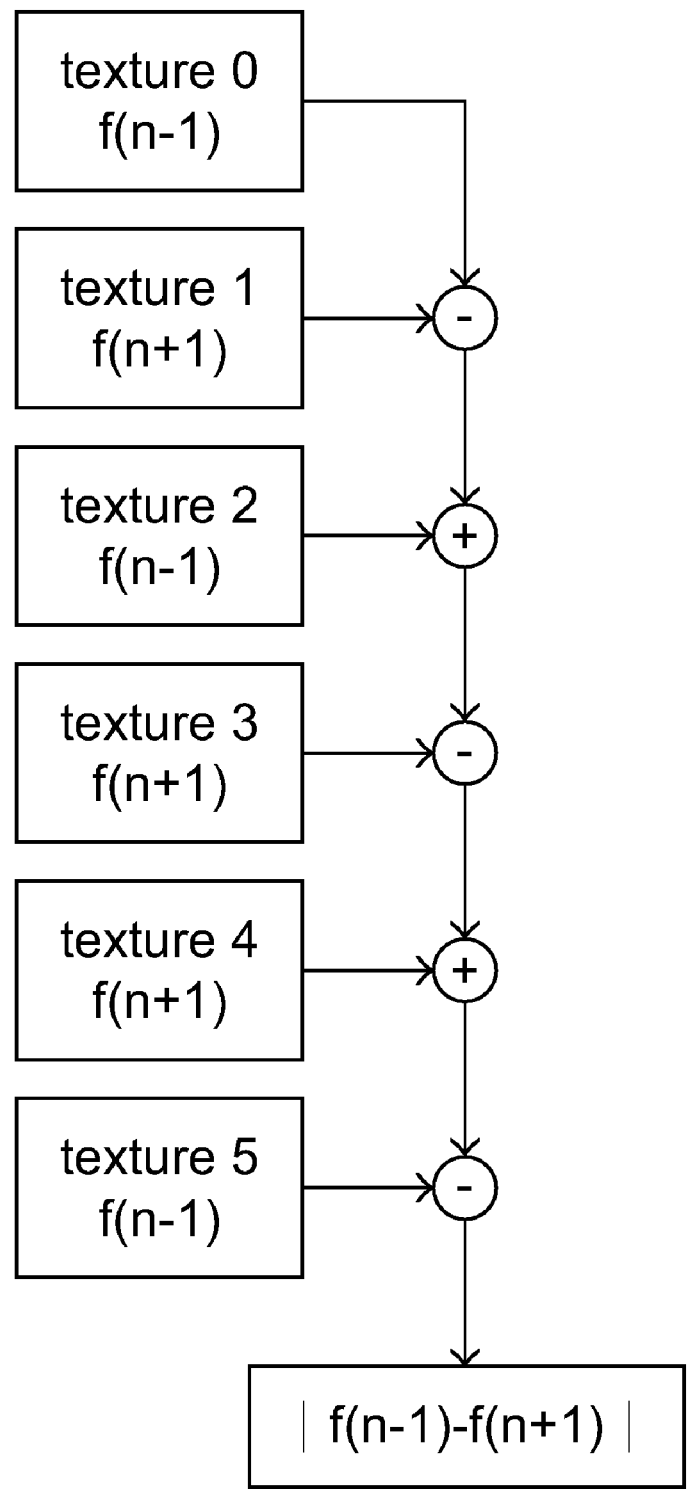
FIGS. 5A~5C are scheme showing absolute-value operations adapted in the first operation unit of FIG. 4.
Figure 5B:
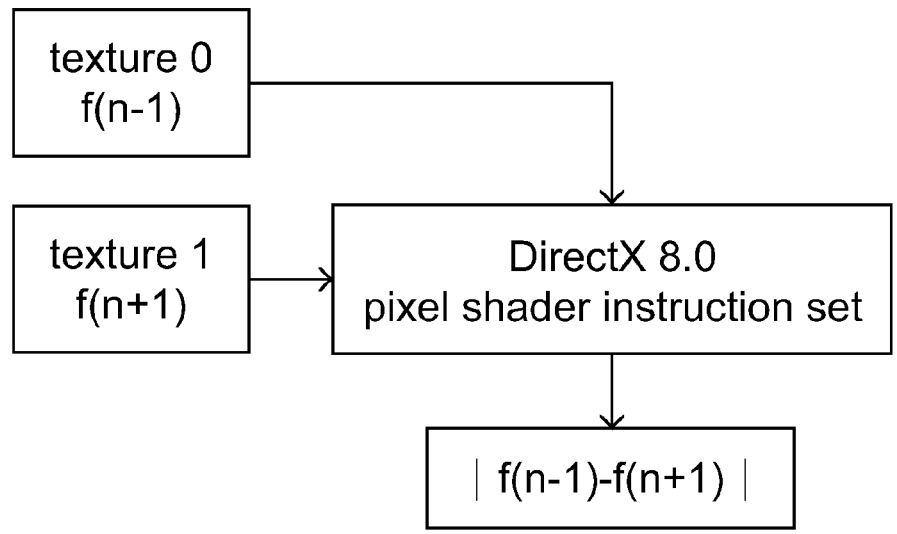
Figure 5C:
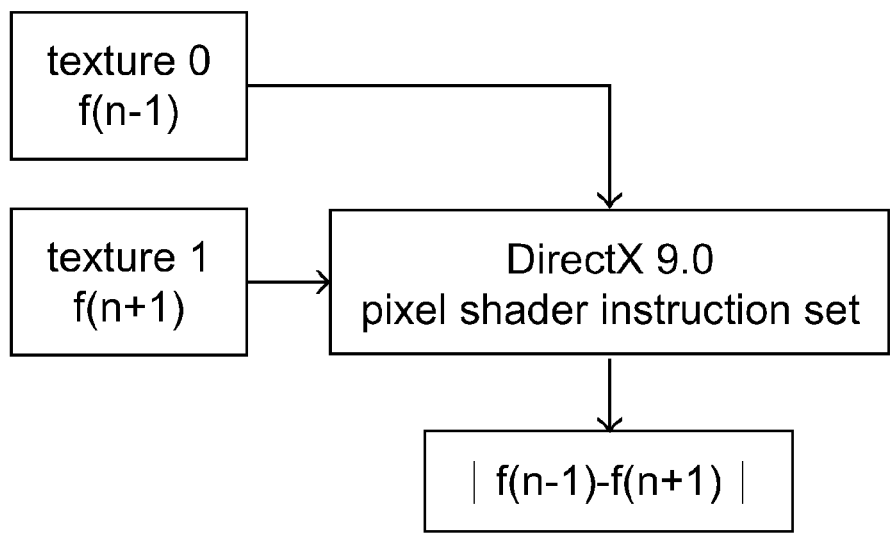

In this embodiment, the operation executed in the first operation unit 41 is an absolute-value operation. The absolute-value operation, for example, can be executed by a texture operation instruction set defined in Microsoft DirectX®. For example, FIG. 5A illustrates a texture operation instruction set defined in Microsoft DirectX® 7.0, in which six textures (Texture 0~5) are used for the absolute-value operation. Alternatively, FIG. 5B and FIG. 5C illustrate texture operation instruction sets defined in Microsoft DirectX® 8.0 and Microsoft DirectX® 9.0, respectively, in which pixel shader instruction sets are used to calculate the absolute value of f(n−1) and f(n+1). It should be understood that the first operation unit 41 may utilize other algorithms or hardwares to determine the levels of motion for pixels in the missing field F'(n) as long as pixels f(n−1) in preceding field F(n−1) and pixels f(n+1) in next field F(n+1) are used therein.

Figure 1:
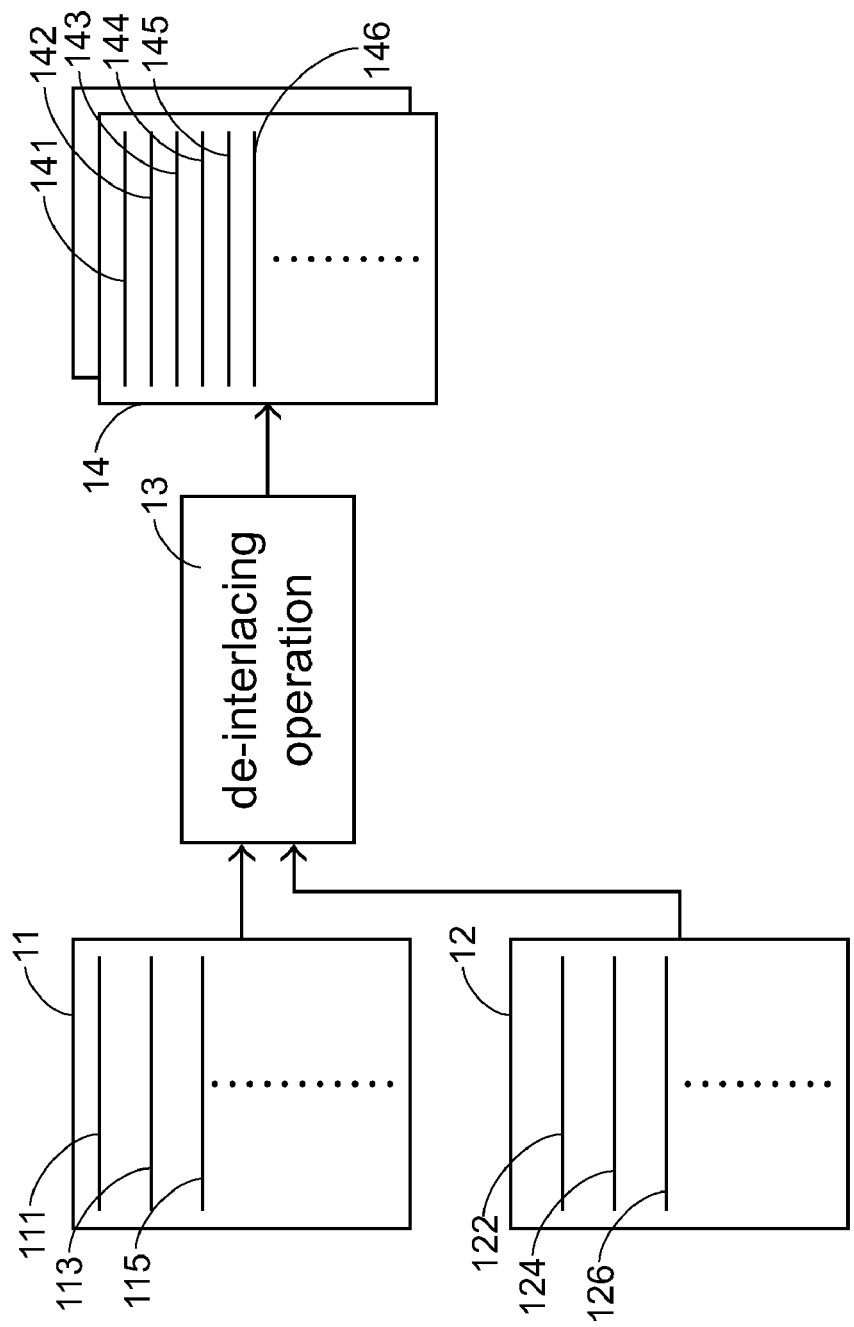
FIG. 1 is a scheme showing an de-interlacing operation.
Figure 2:
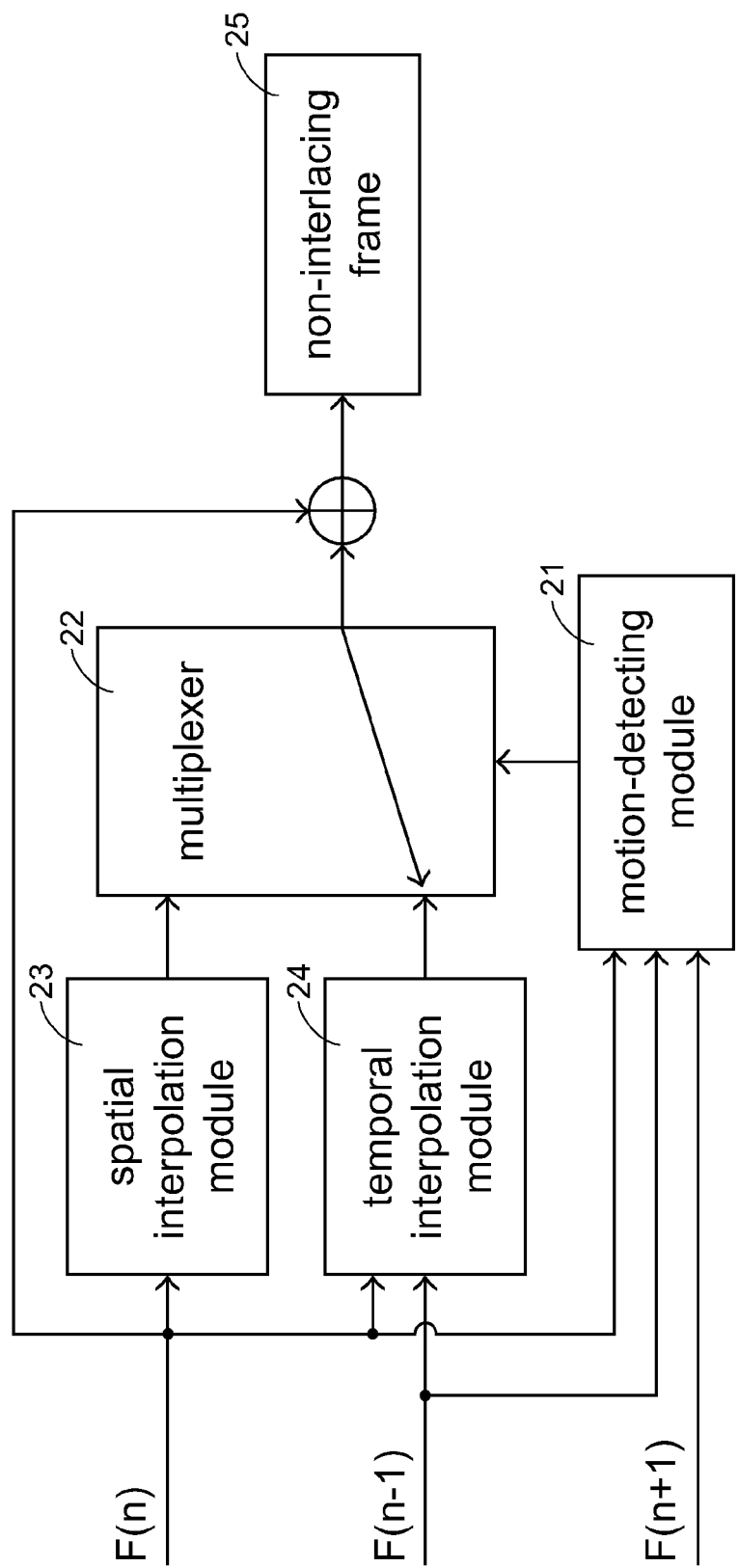
FIG. 2 is a schematic functional block diagram illustrating conventional de-interlacing system.
Figure 3:
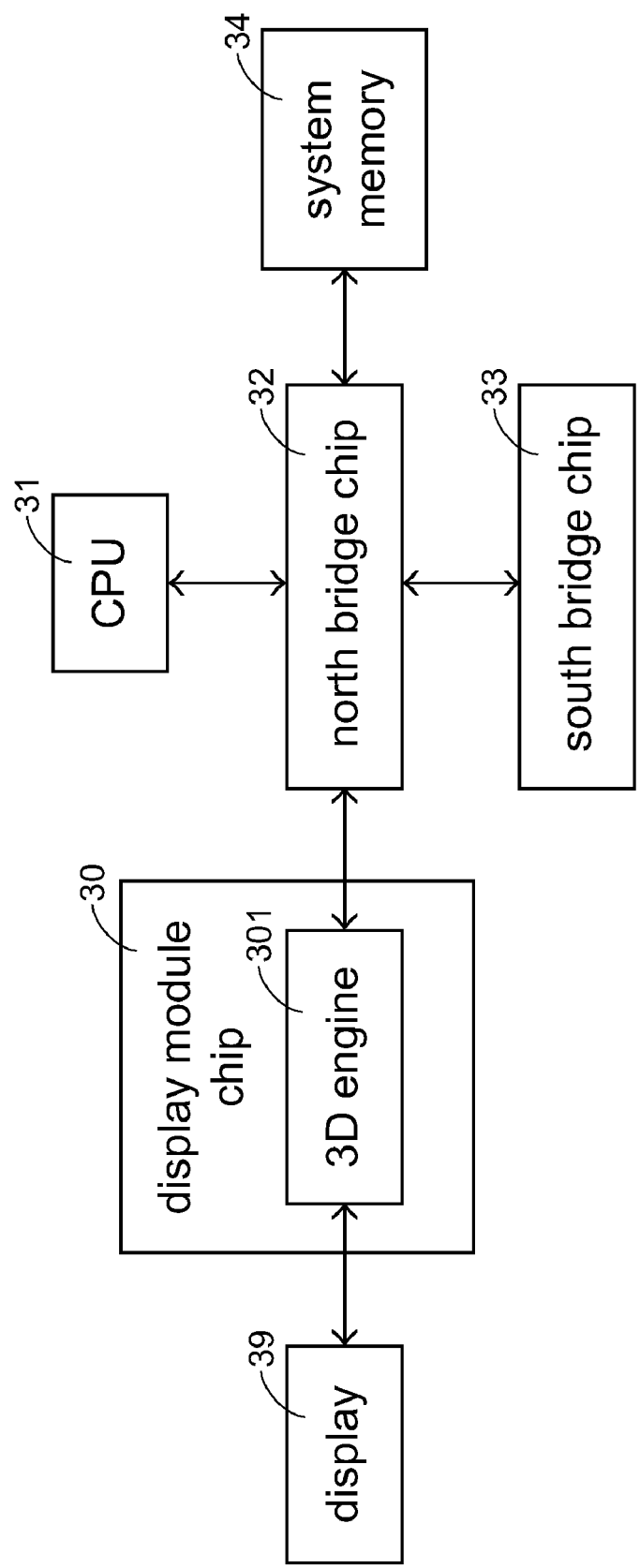
FIG. 3 is a schematic block diagram of a computer system, capable of performing a method for determining color value of pixels for image processing according to the present invention.

In brief, the first operation unit 41 calculates the absolute value of color data between pixels at the same position in the preceding field F(n−1) and the next field F(n+1). The function of the first operation unit 41, for example, can be executed by a three-dimensional (3D) engine conventionally used or specifically designed in a computer system. Please refer to FIG. 3. A computer system includes a central processing unit (CPU) 31, a north bridge chip 32, a south bridge chip 33, a system memory 34, a display module chip 30 and a display 39. The 3D engine 301 is disposed in the display module chip 30 that may stand alone or be incorporated into the north bridge chip 32.

The operations of the 3D engine 301 for implementing the function of the first operation unit 41 for processing the field F(n) include the following:

a) setting pixels in the preceding field F(n−1) and the next field F(n+1) to be textures;
b) performing a texture operation on respective pixels in the preceding field F(n−1) and the next field F(n+1) to obtain absolute values of pixels at the same positions in the preceding field F(n−1) and the next field F (n+1);
c) rendering a rectangle plane consisting of two triangles and writing the absolute values into corresponding pixel positions in the rectangle plane to form a reference rectangle A, the absolute values recorded in the reference rectangle A represent levels of motion of the pixels; and
d) storing the data of the reference rectangle A as depth values in the depth-value buffer (Z buffer) 43.

Following above steps, the second operation unit 42 performs a plurality of texture operations on pixels in the preceding field F(n−1) and the current field F(n) to obtain a plurality of rectangle textures 451-45M corresponding to various levels of motion L1 to LM of the missing field F'(n). Each of the rectangle textures has a size identical to that of the reference rectangle A. The M rectangle textures also correspond to M depth values, i.e. Z1~ZM. Assume that the rectangle texture 45M represents the highest level of motion LM, and the rectangle texture 451 represents the lowest level of motion L1, the other rectangle textures each represents a gradually increased level of motion from L1 to LM, i.e. the rectangle textures 451 to 45M. The higher the level of motion is, the change between two consecutive frames is faster and more drastic. For rectangle texture at the highest level of motion, e.g. LM of the present embodiment, the missing pixels are calculated by interpolating adjacent pixels in the current field F(n) due to the rapid change of frames. The rectangle texture 45M is thus generated, in which the color value f'(n) of the missing field F'(n) is designated according to the value of the current field f(n). On the other hand, changes between frames at the lowest level of motion are relatively small, e.g. L1 of the present embodiment, and therefore pixels of the preceding field F(n−1) can be used as the missing pixels to form the rectangle texture 451 with the color value designated to f(n−1)

In brief, the second operation unit 42 performs a texture operation based on the current field F(n) only at the highest level of motion and the preceding field F(n−1) only at the lowest level of motion. For performing texture operation on rectangle textures in between the highest and the lowest levels of motion, the second operation module 42 applies different ratios to the combination of F(n) and F(n−1). In an embodiment, various linear combinations can be used as the ratios below:

Color data of missing pixels at the $$\text{lowest level of motion } L1(Z = Z1) = f(n-1);$$

Color data of missing pixels at the level of motion $La(Z = Za) =$ $$((a-1)/(M-1)) \times f(n) + ((M-1) - (a-1)/(M-1)) \times f(n-1); \text{ and}$$

Color data of missing pixels at the highest $$\text{level of motion } LM(Z = ZM) = f(n),$$

where 1<a<M and Z1<Za<ZM, color data f(n−1) indicates color data in the preceding field F(n−1), color data f(n) indicates color data in the current field F(n).

For example, assuming M=4,

Color data of missing pixels at the lowest level of motion $L1(Z = Z1) = f(n-1)$;

Color data of missing pixels at the level of motion $L2(Z = Z2) =$
$(1/3) \times f(n) + (2/3) \times f(n-1)$;

Color data of missing pixels at the level of motion $L3(Z = Z3) =$
$(2/3) \times f(n) + (1/3) \times f(n-1)$; and Color data of missing pixels at the highest level of motion $L4(Z = Z4) = f(n)$;

where Z represents the depth value of the rectangle, and $Z1<Z2<Z3<Z4$.

After the reference rectangle A and the rectangle textures 451~45M are obtained, a method for dynamically adjusting color data of pixels is executed, thereby accomplishing the de-interlacing operation. An embodiment of the method will be described hereinafter with reference to the flowchart of FIG. 6A and FIG. 4.

With the provision of the reference rectangle A generated by the first operation unit 41 and stored in the Z buffer 43 and the rectangle textures 451~45M generated by the second operation unit 42 (Step S61), the rendering engine 44 performs a multiple rendering procedure according to the reference rectangle A and rectangle textures 451~45M as follows to obtain a target rectangle B with the same size as the reference rectangle A. In Step S62, the depth value Zx of a pixel P1 in the rectangle texture 45x (M≧x≧1) is compared with a corresponding depth value ZP1 stored in the Z buffer 43. Then the following step determines whether the depth value Zx is smaller than the corresponding depth value ZP1 in the Z buffer 43. (Step S63). If Zx<ZP1, render the color data of the pixel P1 onto the target rectangle B at the same pixel position (Step S64). Otherwise, discard this color data from rendering onto the target rectangle B (Step S65). Later determine whether every pixel of the rectangle texture 45x at the level of motion Lx has completed the comparison in Step S66. If yes, enter Step S67 to determine whether x is equal to M. If x is not equal to M, increment x by 1 and return to Step S62; if x is equal to M, which means all levels of motion have been processed, the rendering process ends and the missing pixels f(n') of an non-interlaced frame F(n') with respect to the current field F(n) are obtained.

Figure 6A:
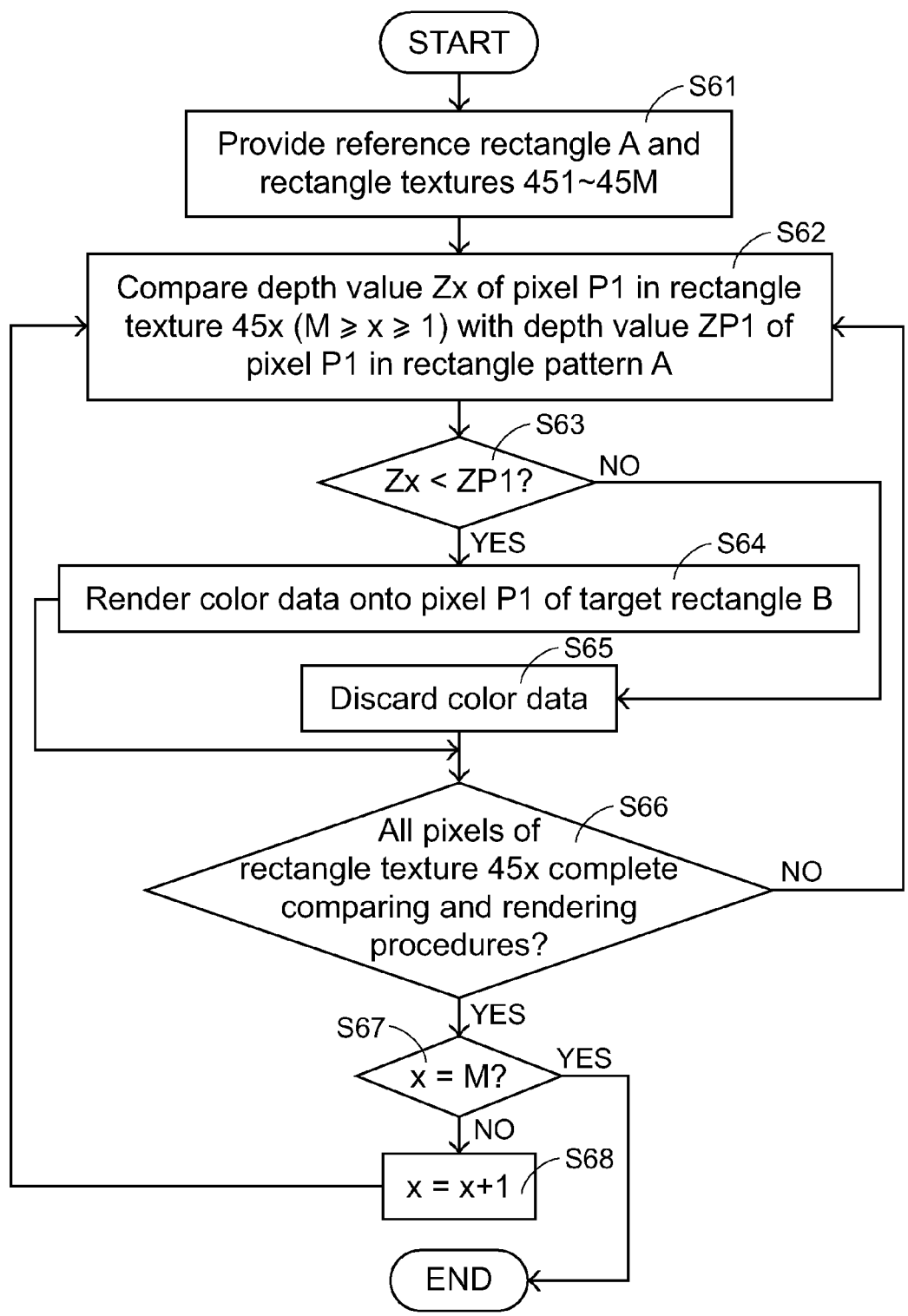
FIG. 6A is a flowchart illustrating a method for determining color value of pixels according to an embodiment of the present invention.
Figure 6B:
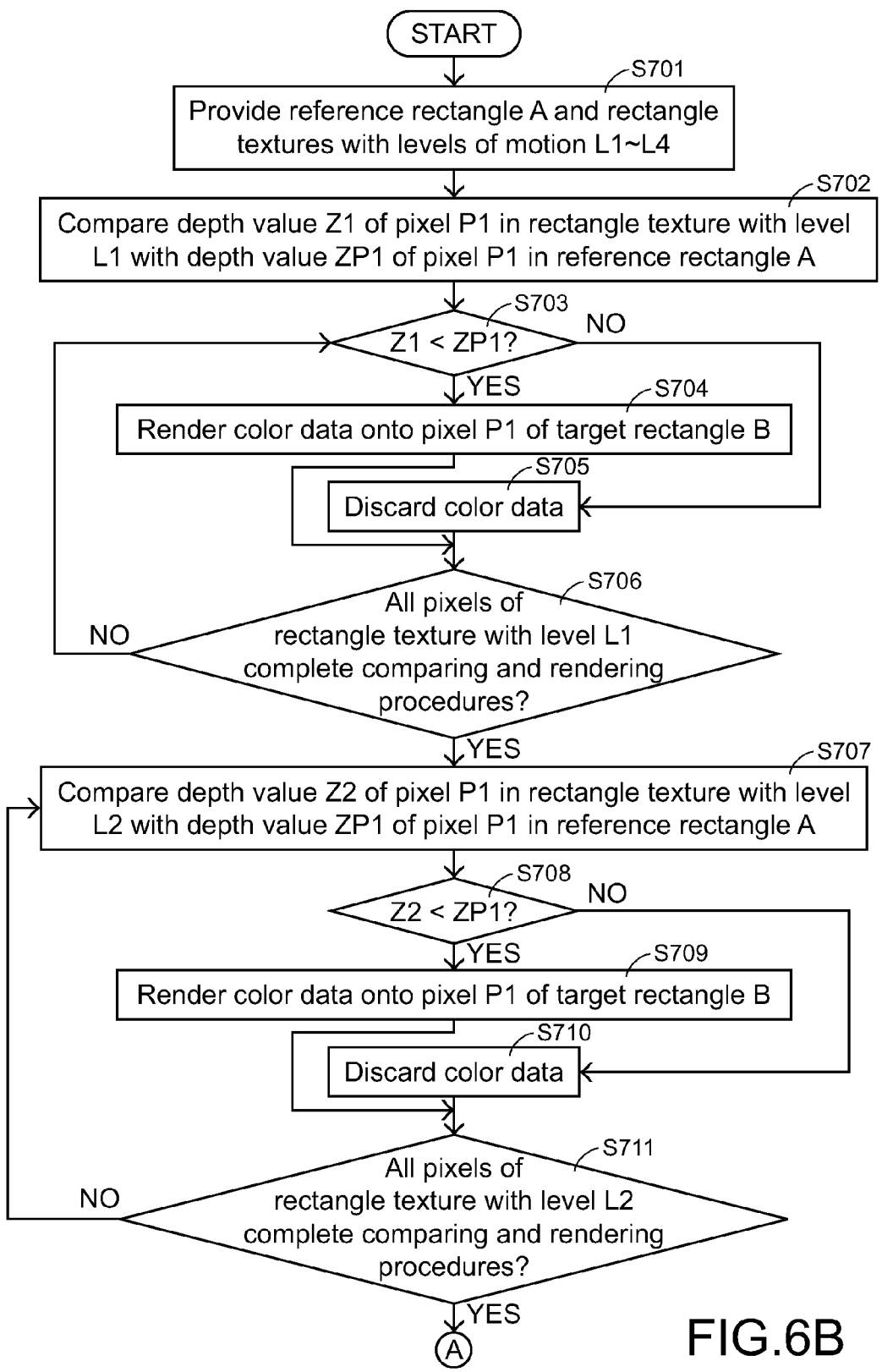
FIGS. 6B and 6C are a flowchart exemplifying the method of FIG. 6A.
Figure 6C:
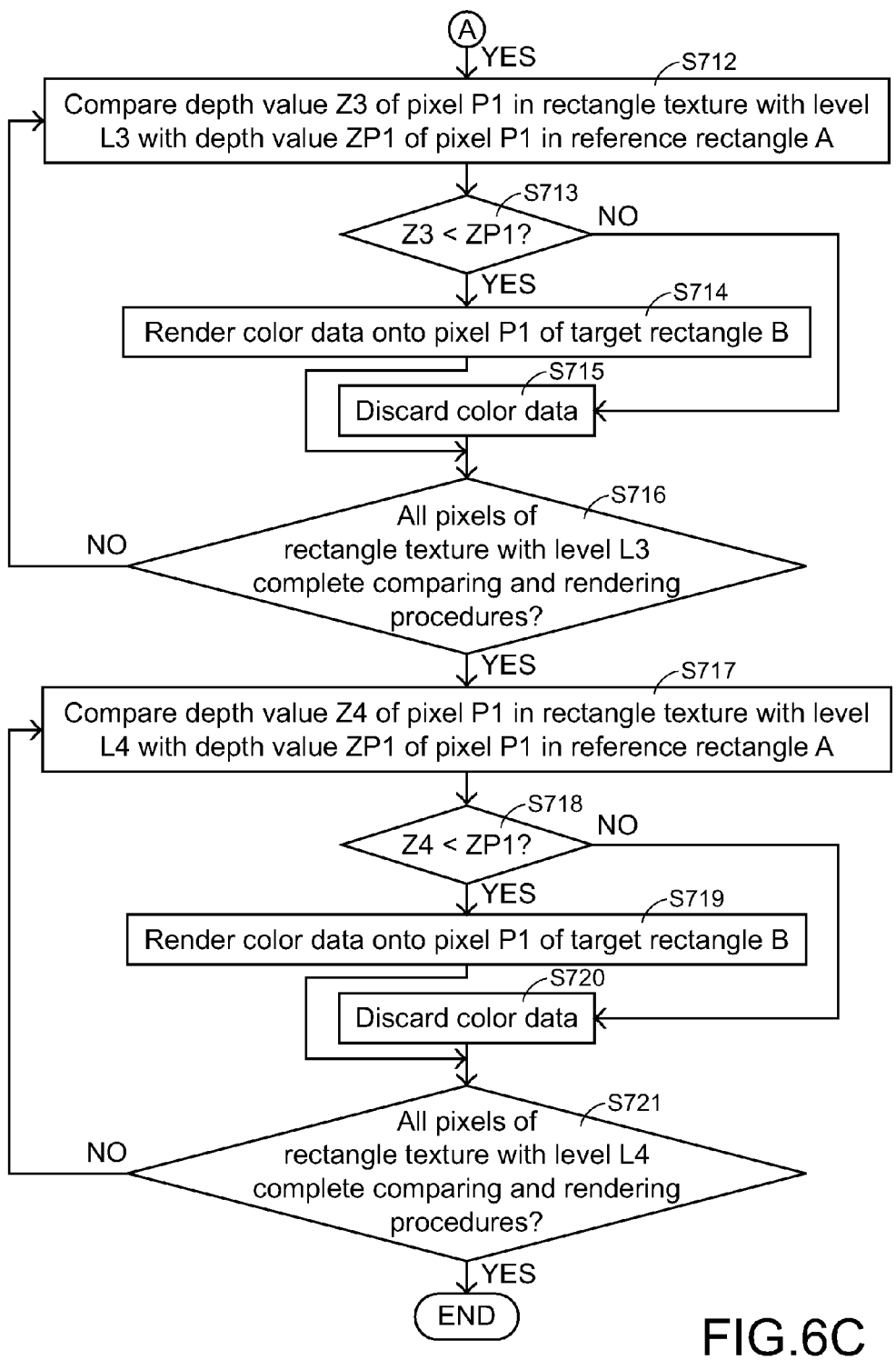

The flowchart of FIGS. 6B~6C exemplifies the method for dynamically adjusting color data of pixels of FIG. 6A with M=4. First of all, a depth buffer having depth values of a reference rectangle and four rectangle textures corresponding to levels of motion L1, L2, L3 and L4 are provided (Step S701). The depth value Z1 of a pixel P1 in the rectangle texture corresponding to level L1 is compared with a corresponding depth value ZP1 stored in the Z buffer 43 (Step S702). If Z1<ZP1 (Step S703), render the color data f(n−1) onto the target rectangle B at the same pixel position (Step S704). Otherwise, discard this color data from rendering onto the rectangle object B (Step S705). Then check if all the pixels of the rectangle texture at the level L1 have been processed with the comparing and discriminating procedures (Step S706). If not yet, continue the comparing and discriminating procedures to another pixel P2 in the same rectangle texture, and so on. It should be noted that the depth value in the depth buffer will not be changed during the rendering process and remain the same. As a result, the color data f(n) of a depth value that is smaller than the corresponding depth value in the Z buffer will be rendered on the surface of the rectangle target B. That is, only when the level of motion of a particular pixel determined by the second operation unit 42 is smaller than that determined by the first operation unit 41 will the color data f(n−1) of the particular pixel be rendered on the surface of the target rectangle B.

If the rectangle texture at level L1 have been completely processed, proceed to the rectangle texture at the next level L2 to compare the depth value Z2 of the pixel P1 in the rectangle texture at level L2 with the depth value ZP1 of the pixel P1 stored in the Z buffer 43 (Step S707). If Z2<ZP1 (Step S708), render the color data $[(1/3) \times f(n)+(2/3) \times f(n-1)]$ onto the target rectangle B (Step S709) so that the new color data will replace the previously rendered color data. Otherwise, discard this color data from rendering onto the target rectangle B (Step S710). Steps S708~S710 are repeated for other pixels of the rectangle texture at level L2 until all the pixels have been processed (Step S711).

Then proceed to next rectangle texture corresponding to level L3 to compare the depth value Z3 of the pixel P1 in the rectangle texture corresponding to level L3 with the depth value ZP1 of the pixel P1 stored in the Z buffer 43 (Step S712). If Z3<ZP1 (Step S713), render the color data $[(2/3) \times f(n)+(1/3) \times f(n-1)]$ onto the target rectangle B (Step S714) so that the color data $[(2/3) \times f(n)+(1/3) \times f(n-1)]$ will replace the previously rendered color data. Otherwise, discard this color data from rendering onto the target rectangle B (Step S715). Steps S713~S715 are repeated for other pixels of the rectangle texture corresponding to the level L3 until all the pixels have been processed (Step S716).

Afterwards, proceed to next rectangle texture corresponding to level L4 to compare the depth value Z4 of the pixel P1 in the rectangle texture corresponding to the level L4 with the depth value ZP1 of the pixel P1 stored in the Z buffer 43 (Step S717). If Z4<ZP1 (Step S718), render the color data f(n) onto the target rectangle B (Step S719) so that the color data f(n) will replace the previously rendered color data. Otherwise, discard this color data from rendering onto the rectangle object B (Step S720). Steps S718~S720 are repeated for other pixels of the rectangle texture corresponding to the level L4 until all the pixels have been processed (Step S721). Then the rendering operation ends.

In the above mentioned procedures, the depth values stored in the Z buffer remain unchanged while the depth values rendered onto the target rectangle B could be updated with the increasing levels of motion. Therefore, for each pixel, color data of a rectangle texture corresponding to a level of motion smaller than but closest to the one recorded in the Z buffer is used as the color data of the pixel and rendered onto the target rectangle B. In this way, the missing pixels f(n') of the non-interlaced field corresponding to the current field F(n) can be found. Then the current field F(n) and the missing field F(n') are combined to form the final non-interlaced frame NIF(n).

In another embodiment, the first operating unit may perform a normalization operation on the absolute values so as to scale down the resulting depth values to particular ranges. For example, the above-mentioned depth values Z1, Z2, Z3 and Z4 can be limited to 0, 1, 2 and 3 with respect to each level of motion as the scale of the overall depth value is defined as 4.

Figure 7:
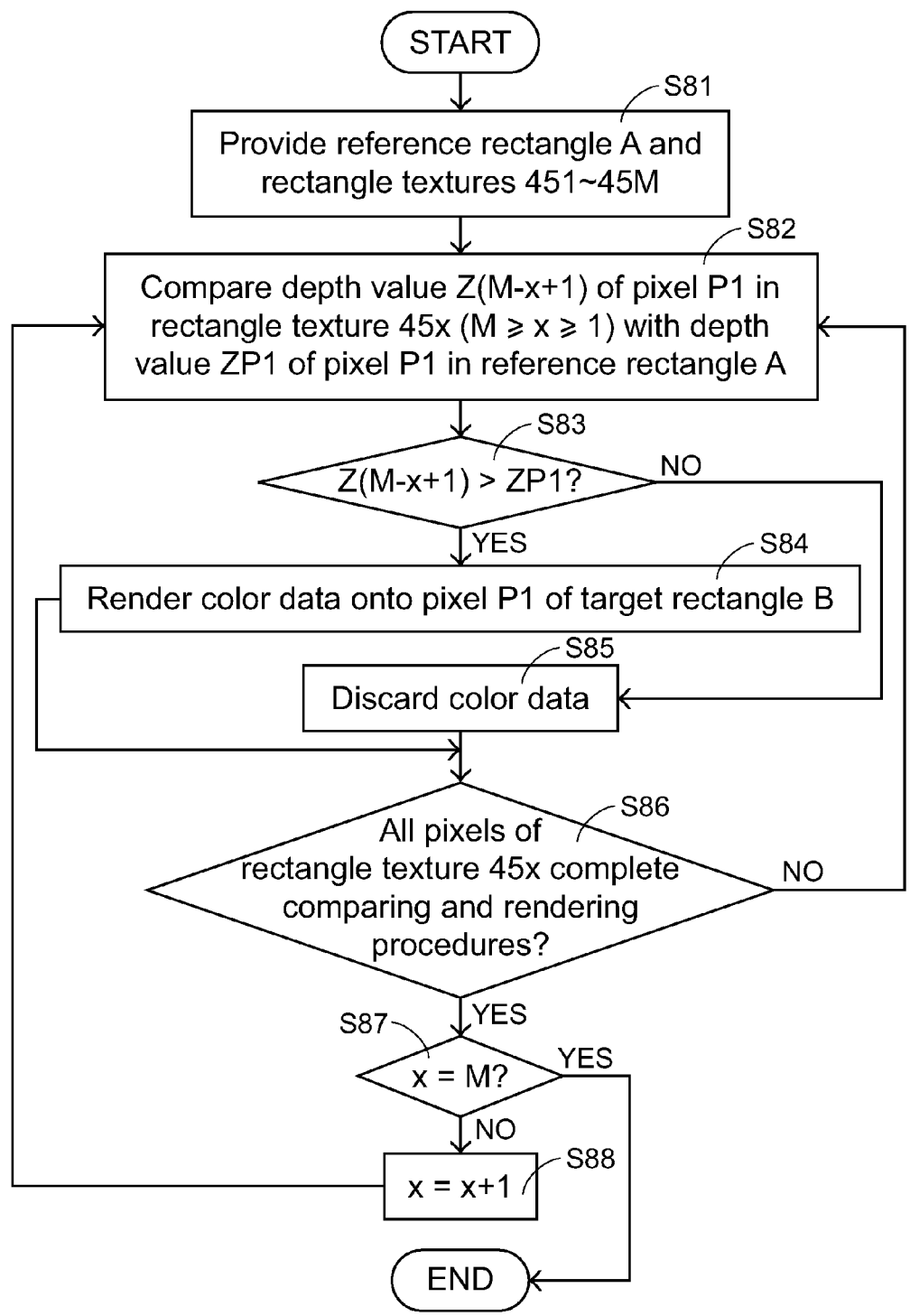
FIG. 7 is a flowchart illustrating a method for determining color value of pixels according to another embodiment of the present invention.

A further embodiment of a method for determining color data of pixels for de-interlacing according to the present invention is illustrated in the flowchart of FIG. 7. The method of FIG. 7 is similar to the method of FIG. 6A except that the higher level of motion is defined with a smaller depth value. That is, in the comparing procedure, the depth value Z(M− x+1) of a pixel P1 in the rectangle texture 45x (M≧x≧1) is compared with a depth value ZP1 stored in the Z buffer 43 (Step 82), and the color data of the pixel P1 is rendered onto the target rectangle B only when Z(M−x+1)>ZP1 (Step S83), while discarding this color data from rendering onto the target rectangle B if Z(M−x+1)≦ZP1 (Step 84). For M levels of motion, Color data of missing pixels at the $$\text{lowest level of motion } L1(Z=ZM)=f(n-1);$$

Color data of missing pixels at level of motion $La(Z=Za)=$ $$((a-1)/(M-1))\times f(n)+((M-1)-(a-1)/(M-1))\times f(n-1); \text{ and}$$

Color data of missing pixels at the highest $$\text{level of motion } LM(Z=Z1)=f(n),$$

where 1<a<M and Z1<Za<ZM, and where color data f(n−1) indicates color data in the preceding field F(n−1), and color data f(n) indicates color data in the current field F(n).

For example, assuming M=4, then

Color data of missing pixels at the $$\text{lowest level of motion } L1(Z=Z1)=f(n-1);$$

Color data of missing pixels at the level of motion $L2(Z=Z2)=$ $$(1/3)\times f(n)+(2/3)\times f(n-1);$$

Color data of missing pixels at the level of motion $L3(Z=Z3)=$ $$(2/3)\times f(n)+(1/3)\times f(n-1); \text{ and}$$

Color data of missing pixels at the highest $$\text{level of motion } L4(Z=Z4)=f(n).$$

In the above mentioned procedures, the depth values stored in the Z buffer remain unchanged while the depth values rendered onto the target rectangle B could be updated with the increasing levels of motion. Therefore, for each pixel, color data of a rectangle texture corresponding to a level of motion greater than but closest to the one recorded in the Z buffer is used as the color data of the pixel and rendered onto the target rectangle B. In this way, missing pixels with color data varying with respective levels of motion can be obtained so as to combine with the interlacing field F(n) to accomplish the de-interlacing operation.

In addition to the de-interlacing operation, the present system and a method for determining color data of pixels can be used in a variety of program-code tools for designing a control chip of an electronic product.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for determining color value of a pixel for an image processing operation, comprising steps of:
   providing a reference depth value representing a level of motion of the pixel;
   providing a plurality of color values and corresponding depth values of the pixel at a plurality of levels of motion; and
   selecting a target color value of the pixel among the plurality of color values according to the reference depth value and the plurality of depth values;
   wherein the reference depth value is obtained by the following steps:
   receiving color values of the pixel in a first field, a second field and a third field respectively, wherein the first field is preceding to the second field and the third field is next to the second field; and
   determining the reference depth value according to the color values of the pixel in the first field and the third field; and
   wherein the plurality of color values correspond to M different levels of motion, the plurality of color values and corresponding depth values Z are determined as: setting the color value of the pixel to f(n−1) and the depth value Z=Z1 at a level of motion Ll; setting the color value of the pixel to [((a−1)/(M−1))xf(n)+((M−1)−(a−1)/(M−1))xf(n−1)] and the depth value Z=Za at a level of motion La; and setting color value of the pixel to f(n) and depth value Z=ZM at a level of motion LM; wherein the color value of the pixel in the first field is f(n−1), the color data of the pixel in the second field is f(n), 1<a <M, and Z is the depth value of the pixel with Zl<Za<ZM.

2. The method according to claim 1, wherein the target color value of the pixel is selected among the color values of all levels of motions which is smaller than and closest to the reference depth value.

3. The method according to claim 2, wherein the selecting step of the target color value includes:
   comparing the depth value at the level of motion La with the reference depth value;
   rendering the color value at the level of motion La in response to the depth value at the level of motion La being smaller than the reference depth value; and
   discarding the color value at the level of motion La in response to the depth value at the level of motion La that is not smaller than the reference depth value;
   wherein the above steps are repeated from the levels of motion Ll to LM and the reference depth value in the depth buffer is not updated.

4. A method for determining color value of a pixel for an image processing operation, comprising steps of:
   providing a reference depth value representing a level of motion of the pixel;
   providing a plurality of color values and corresponding depth values of the pixel at a plurality of levels of motion; and
   selecting a target color value of the pixel among the plurality of color values according to the reference depth value and the plurality of depth values;
   wherein the reference depth value is obtained by the following steps:
   receiving color values of the pixel in a first field, a second field and a third field respectively, wherein the first field is preceding to the second field and the third field is next to the second field; and determining the reference depth value according to the color values of the pixel in the first field and the third field; and wherein the color values of the pixel at the M levels of motion are determined respectively by: setting the color value of the pixel to f(n−1) and the corresponding depth value Z=Z1 at the level of motion L1; setting the color value of the pixel to [((a−1)/(M−1))xf(n)+((M−1)−(a−1)/(M−1))xf(n−1)] and the depth value Z=Za at the level of motion La; and setting color value of the pixel to f(n) and depth value Z=ZM at the level of motion LM;

wherein the color value of pixel in the first field is f(n−1), the color value of the pixel in the second field is f(n), 1<a <M, and Z is the depth value of the pixel with L1<La<LM and Z1<Za<ZM.

5. The method according to claim 4, wherein the target color value of the pixel is selected among the color values at all levels of motions which is larger than and closest to the reference depth value.

6. The method according to claim 5 wherein the selecting step of the target color value includes:

comparing the depth values at the level of motion La with the reference depth value;

rendering the color value at the level of motion La in response to the depth value at the level of motion La being larger than the reference depth value; and discarding the color value at the level of motion La in response to the depth value at the level of motion La that is not larger than the reference depth value;

wherein above steps are repeated from the levels of motion L1 to LM and the reference depth value in the depth-value buffer is not updated.

7. A system for determining color data of a pixel for an image processing operation, comprising:

a depth-value buffer for storing a reference depth value representing a level of motion of the pixel;

a rendering engine coupled to the depth-value buffer for receiving a plurality of color values and corresponding depth values of the pixel at a plurality of levels of motion, respectively, and selecting one of the plurality of color values as a target color value of the pixel according to the reference depth value and the plurality of depth values;

a first operation unit configured to provide the reference depth value in the depth-value buffer; receive first field data and third field data; and determine the reference depth value according to color values of the pixel in the first field and the third field; wherein the first field is preceding to a second field and the third field is next to the second field; and a second operation unit configured to receive the first field data and second field data and to determine color values and depth values of the pixel in M different levels of motion by steps of: setting the color value of the pixel to f(n−1) and the depth value Z=Z1 at the level of motion L1; setting the color value of the pixel to [((a−1)/(M−1))xf(n)+((M−1)−(a−1)/(M−1))xf(n−1)] and the depth value Z=Za at a level of motion La; and setting color value of the pixel to f(n) and depth value Z=ZM at the level of motion LM;

wherein f(n−1) is the color value of pixel in the first field, F(n) is the color value of the pixel in the second field, 1<a <M, and Z is the depth value of the pixel with L1<La<LM and Z1<Za<ZM.

8. The system according to claim 7, wherein the rendering engine selects a target color value of the pixel among the color values at all levels of motion in response to the depth value corresponding to the selected color value is smaller than but closet to the reference depth value.

9. The system according to claim 8, wherein the rendering engine selects the target color value of the pixel by:

comparing the depth values at the level of motion La with the reference depth value;

rendering the color value at the level of motion La in response to the depth value at the level of motion La being smaller than the reference depth value; and discarding the color value at the level of motion La in response to the depth value at the level of motion La is not smaller than the reference depth value;

wherein the above steps are repeated from the levels of motion L1 to LM and the reference depth value in the depth-value buffer is not updated.

10. A system for determining color data of a pixel for an image processing operation, comprising:

a depth-value buffer for storing a reference depth value representing a level of motion of the pixel;

a rendering engine coupled to the depth-value buffer for receiving a plurality of color values and corresponding depth values of the pixel at a plurality of levels of motion, respectively, and selecting one of the plurality of color values as a target color value of the pixel according to the reference depth value and the plurality of depth values;

a first operation unit configured to provide the reference depth value in the depth-value buffer; receive first field data and third field data; and determine the reference depth value according to color values of the pixel in the first field and the third field; wherein the first field is preceding to a second field and the third field is next to the second field; and a second operation unit configured to receive the first field data and second field data and to determine color values and depth values of the pixel in M different levels of motion by steps of: setting the color value of the pixel to f(n−1) and the corresponding depth value Z=Z1 at the level of motion L1; setting the color value of the pixel to [((a−1)/(M−1))xf(n)+((M−1)−(a−1)/(M−1))xf(n−1)] and the depth value Z=Za at the level of motion La; and setting color value of the pixel to f(n) and depth value Z=ZM at the level of motion LM; wherein the color value of pixel in the first field is f(n−1), the color value of the pixel in the second field is f(n), 1<a <M, and Z is the depth value of the pixel with L1<La<LM and Z1<Za<ZM.

11. The system according to claim 10 wherein the rendering engine selects a target color value of the pixel among the color values at all levels of motion in response to the depth value corresponding to the selected color value that is larger than but closet to the reference depth value.

12. The system according to claim 11 wherein the rendering engine selects the color data of the pixel by:

comparing the depth values at the level of motion La with the reference depth value;

rendering the color value at the level of motion La in response to the depth value at the level of motion La is larger than the reference depth value; and discarding the color value at the level of motion La in response to the depth value at the level of motion La is not larger than the reference depth value;

wherein above steps are repeated from level of motion L1 to LM and the reference depth value in the depth-value buffer is not updated.

* * * * *